(12) United States Patent  
Itoh et al.

(10) Patent No.: US 8,971,670 B2
(45) Date of Patent: Mar. 3, 2015

(54) PROOF READING OF TEXT DATA GENERATED THROUGH OPTICAL CHARACTER RECOGNITION

(71) Applicant: International Business Machines Corporation, Armonk, NY (US)

(72) Inventors: Takashi Itoh, Tokyo (JP); Toshinari Itoki, Tokyo (JP); Takayuki Osogami, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 13/669,789

(22) Filed: Nov. 6, 2012

(65) Prior Publication Data

US 2013/0085746 A1      Apr. 4, 2013

Related U.S. Application Data

(63) Continuation of application No. 13/630,474, filed on Sep. 28, 2012.

(30) Foreign Application Priority Data

Sep. 30, 2011   (JP) ................... 2011-216500

(51) Int. Cl.
  *G06K 9/03*        (2006.01)
(52) U.S. Cl.
  CPC ........................ *G06K 9/03* (2013.01)
  USPC ........... 382/311; 382/100; 382/228; 382/229; 382/309; 382/310
(58) Field of Classification Search
  USPC ......... 382/100–102, 105, 112, 114, 160, 224, 382/225, 228–231, 309–311, 321–325; 715/254–257, 269, 271
  See application file for complete search history.

(56) References Cited

U.S. PATENT DOCUMENTS 5,257,328 A * 10/1993 Shimizu ........................ 382/311
5,923,792 A *  7/1999 Shyu et al. .................... 382/309

(Continued)

FOREIGN PATENT DOCUMENTS

JP       3240183      10/1991
JP       5314303      11/1993

(Continued)

OTHER PUBLICATIONS

Sueki Matsumura, Tomonori Kobayashi, Osamu Nakamura and Kenji Ogura, "Document Input According to Recognition Accuracy of Handwritten Characters", IEEE, Proceedings of the Fourth International Conference on Document Analysis and Recognition, vol. 1, Aug. 1997, pp. 51-55.*

(Continued)

*Primary Examiner* — Eric Rush
(74) *Attorney, Agent, or Firm* — Fleit Gibbons Gutman Bongini & Bianco PL; Jeffrey N. Giunta

(57) ABSTRACT

A system includes preparing respective proof reading tools for performing carpet proof reading and side-by-side proof reading of text data, recording a log of time to perform proof reading operations by using the first and second proof reading tools. The method further includes estimating, based on times stored in a log, times to perform proof reading of a character using 1) the first proof reading tool followed by using the second proof reading tool, and 2) the second proof reading tool. The method further includes determining for each character value, based on the estimated times, to use the first proof reading tool along with using the second proof reading tool and determining, or to use the second proof reading tool without using the first proof reading tool.

20 Claims, 8 Drawing Sheets

(56) References Cited

U.S. PATENT DOCUMENTS

| | | | |
|---|---|---|---|
| 6,351,574 B1* | 2/2002 | Yair et al. | 382/321 |
| 2002/0025070 A1* | 2/2002 | Fujino et al. | 382/181 |
| 2002/0196290 A1* | 12/2002 | Zlotnick | 345/844 |
| 2003/0012460 A1* | 1/2003 | Zlotnick et al. | 382/311 |
| 2008/0267505 A1* | 10/2008 | Dabet et al. | 382/181 |

FOREIGN PATENT DOCUMENTS

| | | |
|---|---|---|
| JP | 6290297 | 10/1994 |
| JP | 7057042 | 3/1995 |
| JP | 9179934 | 7/1997 |
| JP | 2003099709 | 4/2003 |
| JP | 2003223608 | 8/2003 |
| JP | 2005309608 | 11/2005 |

OTHER PUBLICATIONS

Sueki Matsumura, Tomonori Kobayashi, Osamu Nakamura and Kenji Ogura, "Selection of Correction Workflow Modes Using Assessment of Character Recognition Accuracy and Effect of Selection", Transactions of Information Processing Society of Japan, vol. 40, No. 4, Apr. 1999, pp. 1840-1850.*

Matsumura, et al. "Selection of Correction Workflow Modes Using Assessment of Character Recognition Accuracy and Effect of Selection," Transactions of Information Processing Society of Japan, vol. 40, No. 4, pp. 1840-1850, Apr. 1999.

Miyahara, et al. "A Confirmation and Modification Method of Character Recognized Results Using a Pattern for Pattern Matching," The Transactions of the Institute of Electronics, Information and Communication Engineers, D-11, vol. J77-D-11 No. 9, pp. 1735-1743, Sep. 1994.

Auer, et al. "Finite-time Analysis of the Maltiarmed Bandit Problem," Machine Learnign, 47 (2/3) pp. 235-256, 2002.

National Center for Biomedical Communications National Library of Medicine, "A Report to the Board of Scientific Counselors Communications Engineering Branch Lister Hill," Oct. 2001, retrieved on Sep. 29, 2011, URL: http://archive.nlm.gov/pubs/reports/mars2001-DIAU/mars2001-DIAU.php.

* cited by examiner

100

PROOF READING OF TEXT DATA GENERATED THROUGH OPTICAL CHARACTER RECOGNITION

CROSS REFERENCE TO RELATED APPLICATIONS

This application is based upon and claims priority from prior U.S. patent application Ser. No. 13/630,474, filed on Sep. 28, 2012, which in turn is based upon and claims priority under 35 U.S.C. 119 from Japanese Application 2011216500, filed Sep. 30, 2011, the entire disclosure of each are hereby incorporated by reference in their entirety.

BACKGROUND

The present invention generally relates to techniques for proof reading digitized text data, and more specifically, it relates to a system, a method, and a program for supporting proof reading of text data generated through optical character recognition.

In order to store paper documents, disclose paper documents on the Internet, and so on, digitization of existing paper documents is generally performed. Although there may be a case where paper documents are digitized simply as images, printed text of the documents is often converted into digital text by using optical character recognition (hereinafter, may be referred to as "OCR") for later edition, retrieval, and so on. However, character recognition is not always performed completely correctly and thus recognition errors may occur. Accordingly, in order to minimize the number of recognition errors, it is generally performed that an operator checks correctness of text having been automatically recognized by a computer by using the computer.

As a background art of this field, Japanese Patent Application Publication No. 2003-099709 discloses an optical character recognition apparatus. When an incorrectly recognized character is corrected on a recognition result correction screen, the optical character recognition apparatus refers to a similar-character-shape set file and reflects the correction on the similar character shapes which include the corrected character and are contained in an intermediate file, thereby performing a collective correction process.

As another background art, Japanese Patent Application Publication No. 07-057042 discloses a character reading apparatus that allows an operator to efficiently convert unreadable characters. In the character reading apparatus, unreadable characters that cannot be converted into character data undergo clustering and are classified into each image group. Each image group includes a representative image and other images, and candidate characters for the image group are extracted. On the basis of the representative image group and the corresponding candidate characters, character images belonging to the representative image group and the candidate characters are displayed on the same display screen. If one of the candidate characters is selected as the correct character or the correct character is newly entered on the display screen, individual character images of the representative image group are collectively converted into character data of the correct character.

As another background art, Japanese Patent Application Publication No. 09-179934 discloses a character recognition apparatus that realizes the small work load of an operator. The character recognition apparatus optically scans characters and figures on a printed document, reads the characters and the figures as image data, extracts a character region and a figure region of the read image data, performs a character recognition process on the character region, and displays the recognition result to prompt an operator to check whether the displayed recognition result is correct. If an error is found in the recognition result, the character recognition apparatus accepts an instruction of the operator, corrects/edits the error in the recognition result, and outputs the final result that is obtained by correcting/editing all errors contained in the recognition result. In such a character recognition apparatus, when a recognition result is displayed in which a character arrangement error resulting from an error in the extraction process exists in each of a plurality of consecutive lines, collective correction/edition is performed on a character string group constituted by an incorrect character string existing in each line by specifying the character string group.

As another background art, Japanese Patent Application Publication No. 06-290297 discloses a character recognition apparatus that accumulates feature information along with position information in an image feature accumulation unit, extracts information accumulated in the image feature accumulation unit by using history information regarding correction made by an operator, performs matching on the extracted reference feature and the following feature, and performs automatic correction on the basis of the result.

As another background art, Japanese Patent Application Publication No. 05-314303 discloses an incorrectly read character correction method that reduces the work for correcting incorrectly read characters of an operator and realizes a decrease in the correction time. In the method, a character or character string corrected by an operator through a key operation or the like is stored as a correction history. A character having been corrected before is detected in the OCR result. An incorrectly read part is displayed to the operator with being highlighted, and the operator is allowed to select a correction candidate character.

As another background art, Japanese Patent Application Publication No. 03-240183 discloses a system for automatically correcting a recognized character in a character recognition result, which can automate the work for checking and correcting an incorrectly recognized character. The system includes: character recognition means for executing recognition on a character-by-character basis in a process of checking and correcting a character recognition result; means for displaying a character recognition result; means for supplying a check result and a correction instruction; a table storing all character recognition results; re-arrangement determining means for determining whether or not the similar recognition error has occurred at another character position when a recognition error in which the correct character is ranked in the second place or lower is corrected so that the correct character is ranked in the first place; and control means for controlling operations of the foregoing means. The re-arrangement means modifies the rank of the candidate character estimated as the correct character to the first place at the character position for which it is determined that the similar recognition error has occurred.

As a background art, Japanese Patent Application Publication No. 2003-223608 discloses a recognized character string correction method that enables collective correction of a recognition result and attempts to improve the accuracy of character correction. In the method, a given character is selected from text data of a recognition result on the basis of an operation instruction of an operator, and the selected character is replaced with a replacement character on the basis of the operation instruction of the operator. Then, a processing-target character is shifted to a character that follows the selected character in the text data, and whether or not the processing-target character is the same as or similar to the selected character is determined. If it is determined that the processing-target character is the same as or similar to the selected character, the character is set as a character subjected to automatic correction and is temporarily replaced with the replacement character. The grammatical construction around the replacement character is analyzed and if it is determined that the grammatical construction is correct, the replacement to the replacement character is confirmed to be valid.

As another background art, Japanese Patent Application Publication No. 2005-309608 discloses a character recognition apparatus that collectively displays character images having similar character shapes on a confirmation screen on which character images of the same category are arranged. In an output mechanism of the character recognition apparatus, image data of characters subjected to a character recognition process is classified into each character (category) recognized in the character recognition process, feature values related to shapes of characters included in the image data in each classified category are determined, the image data is further classified into a plurality of clusters on the basis of the feature values, and a confirmation screen for displaying the image data for each cluster is created and displayed.

As another background art, Sueki Matsumura et al. has proposed an input method in which the most efficient check-and-correction mode is automatically selected from among a plurality of modes in accordance with the recognition accuracy, such as the character recognition rate. A check-and-correction mode that shows the maximum input efficiency is associated with each recognition accuracy level in advance by measurement. As the input efficiency, for example, an input rate that represents the number of characters that can be input per unit time is expected. Next, with reference to the obtained correspondence, the check-and-correction mode that provides the maximum input rate is automatically selected from the recognition accuracy level estimated on the basis of the character recognition result of a document. The input work is performed in accordance with the presented check-and-correction mode.

As another background art, Sucharu Miyahara et al. discloses a multi-stage collective correction method using pattern matching, as an efficient check-and-correction method for Japanese OCR. In this method, rejected characters of the same category are collected and collectively corrected in a first-stage rejection process. In a subsequent-stage error correction process, incorrect characters are detected by using the result of the first-stage rejection process and are correctively corrected again.

BRIEF SUMMARY

When proof reading of text data digitized by OCR is performed, there is a method in which images of paper media recognized as parts sharing the attribute (e.g., character) are extracted and the correctness or incorrectness of the OCR results are collectively checked, whereby the proof reading work is performed efficiently (hereinafter, this method is referred to as "carpet proof reading" and a software tool for realizing carpet proof reading may be referred to as a "carpet proof reading tool"). In this method, only whether or not the images match the attribute of the current verification target is determined. Also, multiple parts sharing the attribute can be advantageously corrected at the same time when recognition errors are found.

It may be difficult to determine whether or not the OCR result is correct in carpet proof reading, for example, in a case where information regarding the context is needed in order to determine which character that the target character is recognized as when the shared attribute is the "character". In order to determine the correctness or incorrectness of such OCR results, it may be necessary to perform, after performing carpet proof reading, proof reading on the digitized text by using a method in which proof reading is performed by comparing the text with the original image without performing extraction based on the shared attribute (hereinafter, this method is referred to as "side-by-side proof reading" and a software tool for realizing side-by-side proof reading may be referred to as a "side-by-side proof reading tool").

However, for example, when carpet proof reading is performed on characters that are rarely misrecognized, carpet proof reading takes longer than side-by-side proof reading. That is, it may be efficient to perform side-by-side proof reading without performing carpet proof reading. However, there has been no solution for solving such a problem.

Accordingly, it is an object of the present invention to provide a system, a program, and a method for more efficiently supporting the work for proof reading text data generated through optical character recognition.

To this end, there is provided a system for supporting proof reading of text data generated through optical character recognition. The system includes: a first proof reading tool for performing carpet proof reading on the text data; a second proof reading tool for performing side-by-side proof reading on the text data; a storage unit configured to store a log of proof reading operations having been performed by using the first and second proof reading tools; and an analysis unit configured to determine, for each attribute serving as units in which carpet proof reading is performed with the first proof reading tool, whether or not to use the first proof reading tool in proof reading of the attribute, by comparing a first estimated value of a time taken when proof reading is performed by using the first proof reading tool with a second estimated value of a time taken when proof reading is performed by using the second proof reading tool without using the first proof reading tool, the first and second estimated values being calculated on the basis of the log.

Preferably, the attribute serving as units in which carpet proof reading is performed may be a character.

Proof reading may be preferably performed by using the second proof reading tool after proof reading is performed by using the first proof reading tool. When whether or not a recognized character is correct is unknown in the proof reading performed by using the first proof reading tool, the recognized character may be preferably attached with a mark indicating that correctness is unknown. Furthermore, the character attached with the unknown mark may be preferably presented to an operator so that it is indicated that whether or not the character is correct is unknown in carpet proof reading.

Preferably, the system may further include a calculation unit configured to calculate statistical information on the basis of the log. Furthermore, the calculation unit preferably may be able to calculate, for each character, as the statistical information, at least one of a: an estimated value of an expected value of a ratio of the number of character images that have been incorrectly recognized by OCR and have been corrected in carpet proof reading to the number of character images that have been processed, b: an estimated value of an expected value of a ratio of the number of character images that have been incorrectly recognized by OCR and have not been corrected in carpet proof reading to the number of character images that have been processed, u: an estimated value of an expected value of a time taken for attaching one character image with a mark indicating that correctness of OCR is unknown, w: an estimated value of an expected value of a time taken for correcting one character image in side-by-side proof reading, and w': an estimated value of an expected value of a time taken for correcting one character image in carpet proof reading.

The analysis unit may preferably calculate, on the basis of the statistical information, at least one of ã: an estimated value of the lower limit of the expected value of the ratio of the number of character images that have been incorrectly recognized by OCR and have been corrected in carpet proof reading to the number of character images that have been processed, b̃: an estimated value of the lower limit of the expected value of the ratio of the number of character images that have been incorrectly recognized by OCR and have not been corrected in carpet proof reading to the number of character images that have been processed, ũ: an estimated value of the lower limit of the expected value of the time taken for attaching one character image with the mark indicating that correctness of OCR is unknown, w̃: an estimated value of the lower limit of the expected value of the time taken for correcting one character image in side-by-side proof reading, and w̃': an estimated value of the lower limit of the expected value of the time taken for correcting one character image in carpet proof reading, and determine whether or not to use the first proof reading tool in proof reading of the character on the basis of a result of the calculation.

The analysis unit may preferably determine whether or not to use the first proof reading tool in proof reading of the character in accordance with a procedure as follows:

$$L := \text{empty set, for each } x \text{ in } X,$$

$$\tilde{a} \equiv \max\left(a - \sqrt{\frac{2\log M}{M}}, 0\right)$$

$$\tilde{b} \equiv \max\left(b - \sqrt{\frac{2\log M}{M}}, 0\right)$$

$$\tilde{u} \equiv \max\left(u - (u_U - u_L)\sqrt{\frac{2\log N_U}{N_U}}, u_L\right)$$

$$\tilde{w} \equiv \max\left(w - (w_U - w_L)\sqrt{\frac{2\log N_w}{N_w}}, w_L\right)$$

$$\tilde{w}' \equiv \max\left(w' - (w'_U - w'_L)\sqrt{\frac{2\log N_{w'}}{N_{w'}}}, w'_L\right)$$

if $\tilde{b}\tilde{u} < \tilde{a}(\tilde{w} - \tilde{w}')$, add $x$ to $L$, where L: a set of characters contained in a target list, X: a set of characters that possibly appear in a document, x: an element of the set of characters X that appears in the document, $u_U$: the upper limit (predetermined) of the time taken for attaching one character image with the mark indicating that correctness of OCR is unknown, $u_L$: the lower limit (predetermined) of the time taken for attaching one character image with the mark indicating that correctness of OCR is unknown, $w_U$: the upper limit (predetermined) of the time taken for side-by-side proof reading of one character image, $w_L$: the lower limit (predetermined) of the time taken for side-by-side proof reading of one character image, $w'_U$: the upper limit (predetermined) of the time taken for correcting one character image in carpet proof reading, and $w'_L$: the lower limit (predetermined) of the time taken for correcting one character image in carpet proof reading.

The calculation unit may preferably perform clustering on a plurality of characters, and calculate, for each cluster, the statistical information from the log. Furthermore, the calculation unit preferably may be able to perform one of (1) formation of one cluster for all characters, (2) formation of a cluster based on a space of each parameter of the statistical information, and (3) formation of a cluster for each character type.

Preferably, the system may further include a list in which the attribute for which the first proof reading tool is to be used is written on the basis of the determination of the analysis unit. Preferably, the system may further include a control unit configured to control the first and second proof reading tools on the basis of the list.

The first proof reading tool may be a context-attached carpet proof reading tool. Also, the second proof reading tool may preferably arrange and present image data and text data in units of at least one of pages, sentences, and lines.

Although the summary of the present invention has been described as the system for supporting proof reading of text data above, the present invention may be considered as a method, a program, a program product, software, a software product, an apparatus, and so forth. The program product or the software product can include, for example, a storage medium having the program or the software stored thereon or a medium over which the program or the software is transmitted.

It should be noted that the foregoing summary of the invention does not include all necessary features of the present invention, and a combination or a sub-combination of these components may also constitute the invention.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Although an embodiment for carrying out the present invention will be described in detail below on the basis of the drawings, the following embodiment does not limit the invention described in claims. Additionally, all combinations of features described in the embodiment are not necessarily mandatory for the solutions of the present invention.

Also, the present invention can be carried out in many different forms and should not be limited to the content described in the embodiment. Throughout the description of the embodiment, the same components are assigned the same references.

Figure 1:
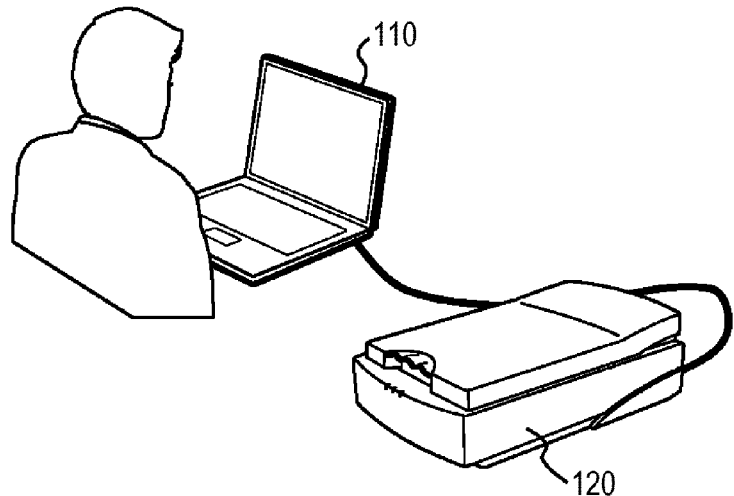
FIG. 1 is a diagram illustrating an example of an appearance image of a data processing system in an embodiment of the present invention.

FIG. 1 is a diagram illustrating an example of an image of the entire data processing system in an embodiment of the present invention. A data processing system 100 includes a terminal 110 that is operated by an operator who proofreads text data obtained by digitizing a paper document, and a scanner 120 that can scan a paper document to generate electronic image data.

In the embodiment of the present invention, many paper documents are scanned by the scanner 120 and generated image data thereof is sent to the terminal 110. Optical character recognition (OCR) software is installed in the terminal 110 of the embodiment of the present invention. Accordingly, the terminal 110 recognizes characters existing in the document from the received document image data, and converts the document image data into text data.

It is assumed in the embodiment of the present invention that converted text data is not completely correct because of the nature of the OCR software installed in the terminal 110. An operator operates proof reading software installed in the terminal 110 to check correctness or incorrectness of a recognized character and to correct an incorrectly recognized character. In order to proofread the text data, the operator operates the application program using input devices, such as a keyboard and a mouse, via a graphical user interface in a window that visually presents information, such as the progress of the work, on a display device of the terminal 110.

It is assumed that the proof reading software used in the embodiment of the present invention has a carpet proof reading function and a side-by-side proof reading function. The carpet proof reading function of the embodiment of the present information provides an environment for efficiently performing the proof reading work by extracting image data portions recognized as the same character and allowing the operator to collectively check correctness or incorrectness of the OCR results.

The side-by-side proof reading function used in the embodiment of the present invention does not extract images having the same character unlike the carpet proof reading function but compares the original image with the text data in predetermined units for proof reading. In the embodiment of the present invention, for example, a case is described in which the side-by-side proof reading function has a function of presenting an image of a page of a document and corresponding recognized text to the operator on the same screen, thereby allowing the operator to perform proof reading. However, the units in which the image and the text data are displayed by the side-by-side proof reading function are not limited to pages, and the image and the text data may be compared in units of sentences or lines.

During the work performed using the carpet proof reading function of the embodiment of the present invention, the operator only has to determine whether each of the collectively displayed images is the current verification target character. Accordingly, the load of the operator may be reduced and the efficiency of the work may improve. Also, images including the same character are often incorrectly recognized by OCR in the same manner. Thus, when similar recognition errors are found at multiple positions in proof reading using the carpet proof reading function, the multiple positions can be advantageously corrected at the same time. On the other hand, the carpet proof reading function of the embodiment of the present invention may involve a case where it is difficult to determine correctness or incorrectness of the OCR results, such as a case where context information is needed to determine the character that the target image is recognized as.

It is assumed in the embodiment of the present invention that, when the operator is unable to determine whether or not the OCR result is correct during carpet proof reading, the operator attaches a mark indicating that correctness or incorrectness is unknown to the corresponding image, and side-by-side proof reading is then performed in order to finally determine correctness or incorrectness and make correction if necessary. However, in the embodiment of the present invention, regarding some images, carpet proof reading is omitted and side-by-side proof reading is performed from the beginning. That is, in the embodiment of the present invention, the data processing system 100 includes a mechanism for performing control so that both carpet proof reading and side-by-side proof reading are performed or side-by-side proof reading alone is performed without carpet proof reading.

In the embodiment of the present invention, such control is automatically performed on the basis of a pre-specified list, analysis of character recognition output, inference based on text structure, and statistical information obtained from a past proof reading log. As a result of such control, efficient proof reading work is realized.

Figure 2:
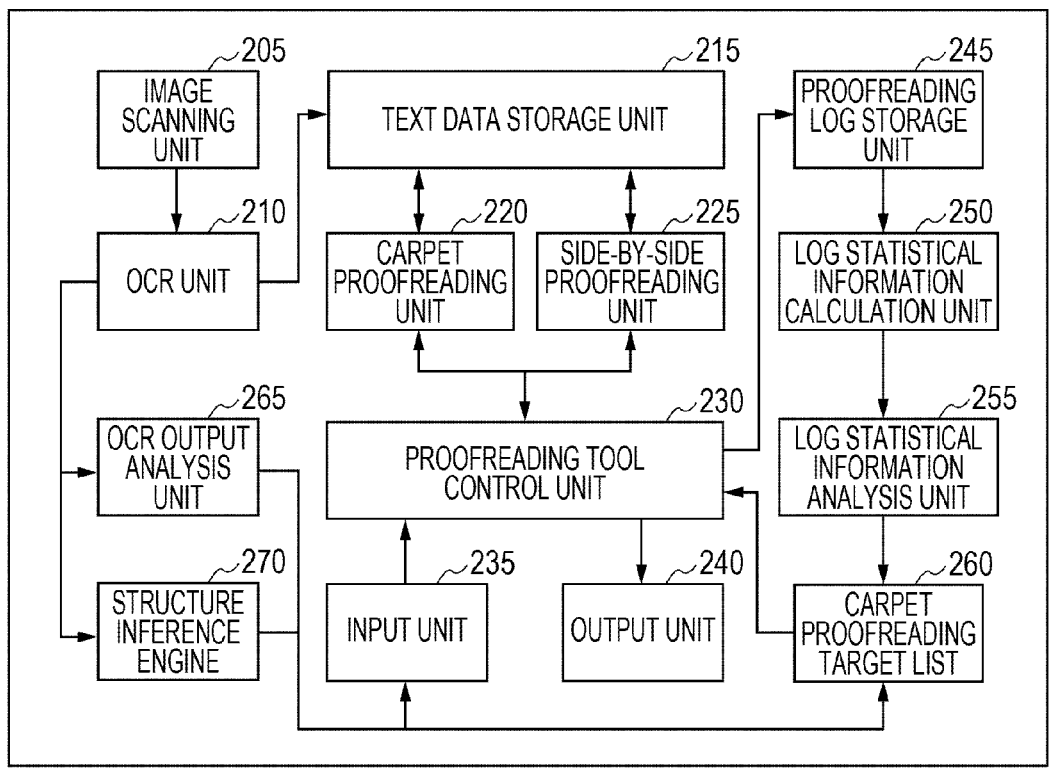
FIG. 2 is a functional block diagram of the data processing system in the embodiment of the present invention.

FIG. 2 is a functional block diagram of the data processing system 100 of the embodiment of the present invention. Each component illustrated in the functional block diagram of FIG. 2 is implemented by a combination of an information processing apparatus having a hardware configuration illustrated in FIG. 9 and a scanner, or by loading computer programs, such as the operating system, the OCR software, the proof reading software stored in a hard disc drive (HDD) 13 to a main memory 4, and reading the computer programs by a central processing unit (CPU) 1, thereby causing hardware resources and software to operate in cooperation. Specifically, an image scanning unit 205 is implemented in the scanner 120, whereas other components are implemented in the terminal 110.

The data processing system 100 of the embodiment of the present invention includes the image scanning unit 205, an OCR unit 210, a text data storage unit 215, a carpet proof reading unit 220, a side-by-side proof reading unit 225, a proof reading tool control unit 230, an input unit 235, and an output unit 240.

In this embodiment of the present invention, the image scanning unit 205 optically scans a paper document to generate image data, and supplies the image data to the OCR unit 210. The OCR unit 210 having received the image data of the document recognizes characters existing in the image data, and converts the image data into text data. The OCR unit 210 may also extract other attributes from the image data. Each character contained in the generated text data is associated with a corresponding image portion, information on a position in the image data, or the like, and is stored in the text data storage unit 215. If the other attributes are extracted, these attributes may be stored in association with the corresponding character. Since the image scanning unit 205, the OCR unit 210, and the text data storage unit 215 can be appropriately carried out by those skilled in the art by using the existing scanning technique, OCR technique, and storage technique, these are not to be described herein any further.

The carpet proof reading unit 220 of the embodiment of the present invention has a function of providing an environment for performing efficient proof reading work by extracting portions of the image data of the paper document that are recognized as the same character, and collectively displaying the portions to allow an operator to collectively check whether or not the OCR results are correct.

Figure 6:
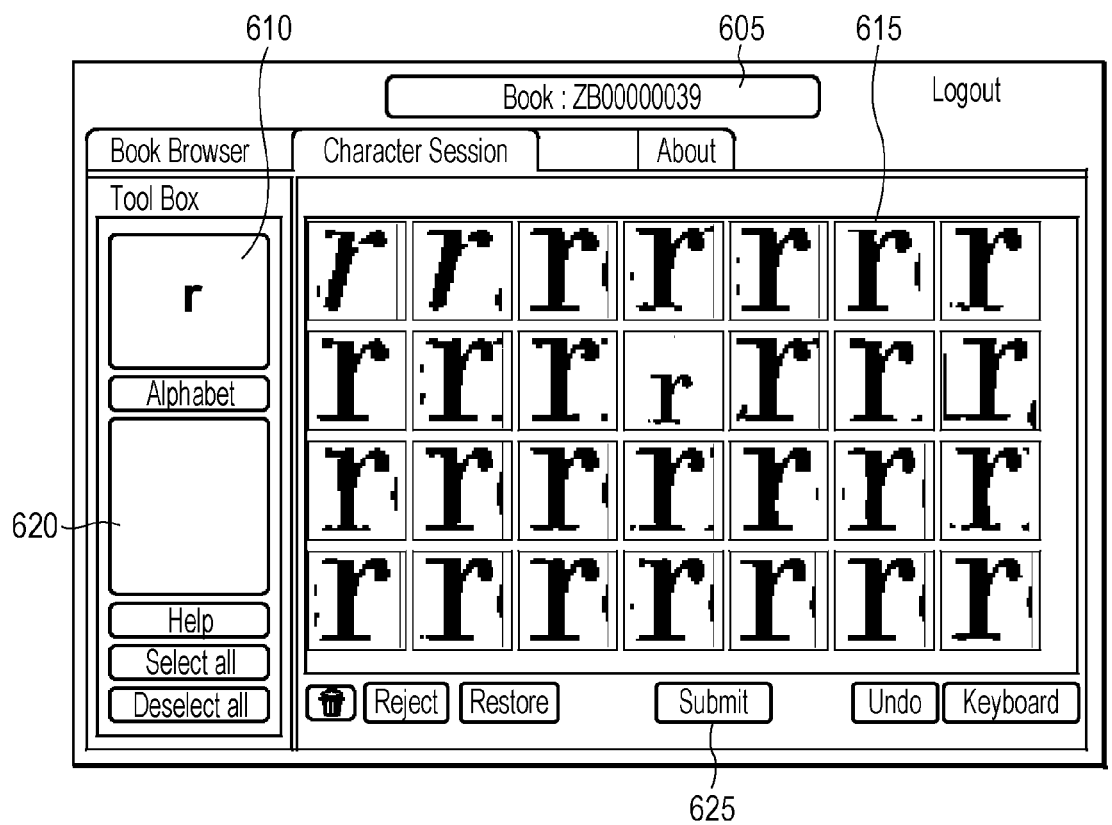
FIG. 6 is an example of a snapshot of an interface used in the carpet proof reading process of the data processing system in the embodiment of the present invention.

FIG. 6 is an example of a snapshot of an interface 600 used for performing carpet proof reading in the environment provided by the carpet proof reading unit 220 in the embodiment of the present invention. At an upper part 605 of the interface 600 for carpet proof reading, an identifier for identifying a document is displayed. Portions of the image data of the document that are recognized as portions having a common attribute 610 (character "r" herein) are extracted and arranged in a field 615 just like a carpet. The operator determines whether or not each arranged image portion is recognized as the character "r" via this interface 600. For example, when the OCR result is incorrect (e.g., when an image of a character "(gamma)" is incorrectly recognized as the character "r"), the operator selects the incorrect image by single clicking, enters the correct character (" " herein) in an entry field 620, and presses a button 625, thereby making correction. When OCR results of multiple image portions are incorrect, the operator can correct the multiple OCR recognition errors at the same time by collectively selecting the multiple image portions and performing the same operation.

Figure 7:
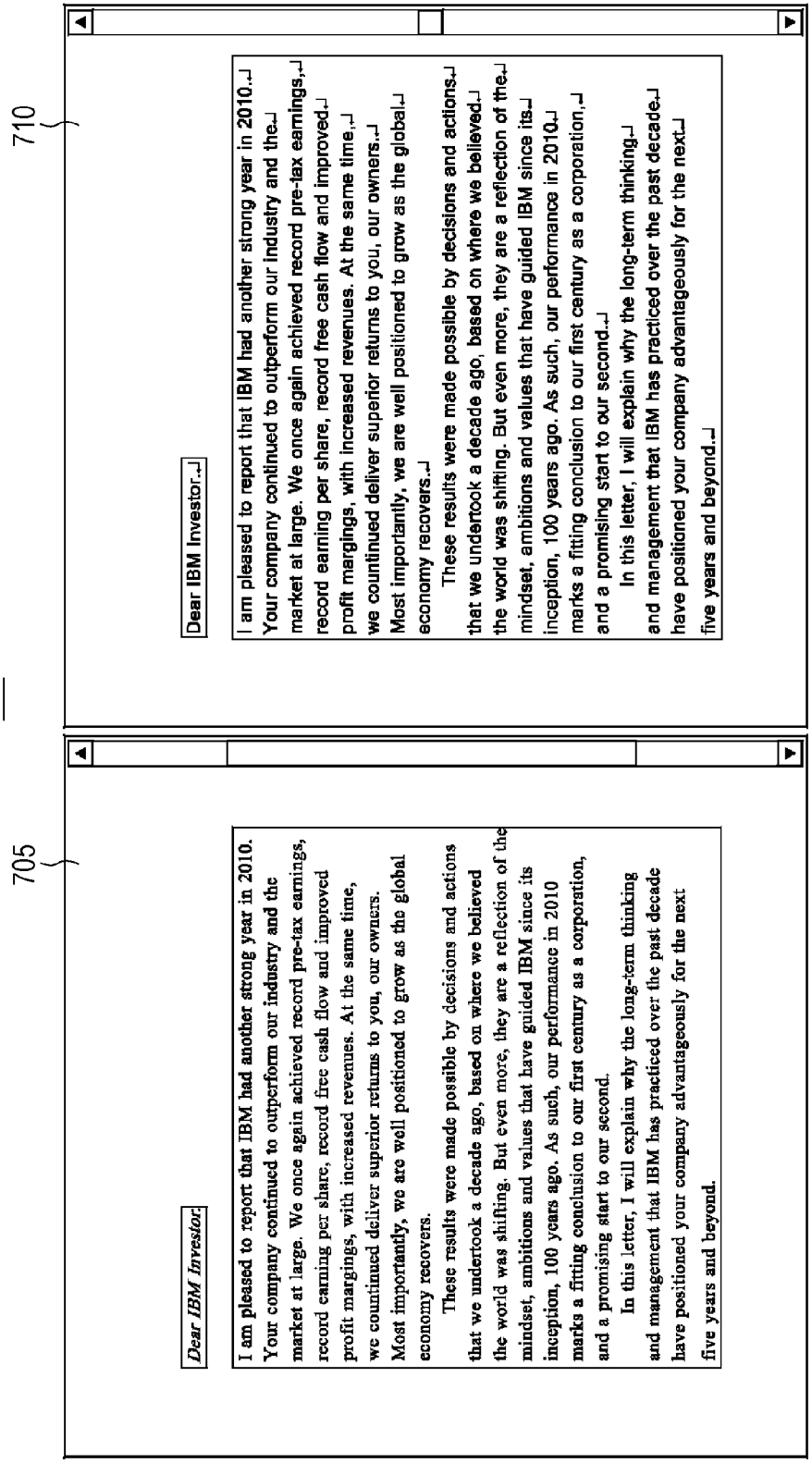
FIG. 7 is an example of a snapshot of an interface used in the side-by-side proof reading process of the data processing system in the embodiment of the present invention.

The side-by-side proof reading unit 225 of the embodiment of the present invention does not perform extraction based on the common character unlike the carpet proof reading unit 220 but has a function of providing an operator with an environment for performing proof reading by comparing the original image and the text data in predetermined units. By way of example, the function of presenting an image of a page of the document and corresponding recognized text to the operator on the same screen for proof reading is illustrated in FIG. 7. However, the units of displaying performed by the side-by-side proof reading function are not limited to pages and the side-by-side proof reading unit 225 can compare the image and the text data in units of sentences or lines.

FIG. 7 is an example of a snapshot of an interface 700 used for performing side-by-side proof reading in the environment provided by the side-by-side proof reading unit 225 in the embodiment of the present invention. An image 705 of one page of the paper document is displayed on the left part of the interface 700 for side-by-side proof reading. In the right part, a portion of the text data resulting from OCR that corresponds to the image 705 is displayed according to a layout 710 that is similar to the image 705. If the operator finds mismatching parts during comparison of the right-side image and the left-side text, the operator corrects the text displayed in the layout 710. In the side-by-side proof reading in the embodiment of the present invention, the operator has to compare the left-side image and the right-side text and is unable to perform collective correction. Thus, the side-by-side proof reading may take longer than the carpet proof reading. On the other hand, in the side-by-side proof reading, the operator can determine the correctness or incorrectness with reference to the context, and thus may be able to find OCR recognition errors that may be missed in carpet proof reading.

Referring back to FIG. 2, the proof reading tool control unit 230 of the embodiment of the present invention determines whether or not to perform carpet proof reading by using the carpet proof reading unit 220 for each character, with reference to a carpet proof reading target list 260, which is created on the basis of pre-specification, analysis of OCR output, inference based on text structure, and statistical information extracted from a past proof reading log. Specifically, the proof reading tool control unit 230 has a function of controlling the proof reading mode for each character, with reference to the carpet proof reading target list 260 so that proof reading is performed by using both the carpet proof reading unit 220 and the side-by-side proof reading unit 225, proof reading is performed by using the side-by-side proof reading unit 225 alone, or carpet proof reading and side-by-side proof reading are not performed.

Also, the proof reading tool control unit 230 supplies a proof reading operation that is entered by the user via the input unit 235 to the carpet proof reading unit 220 and the side-by-side proof reading unit 225. The proof reading tool control unit 230 also supplies the output unit 240 with information to be presented to a user and received from the carpet proof reading unit 220 and the side-by-side proof reading unit 225. Further, the proof reading tool control unit 230 monitors the carpet proof reading unit 220 and the side-by-side proof reading unit 225, generates log information which includes the time taken for correction and the correctness or incorrectness of character recognition in each of the units, and supplies the log information to a proof reading log storage unit 245. The input unit 235 receives input from the user and supplies the input to the proof reading tool control unit 230. The output unit 240 receives information to be presented to the user from the proof reading tool control unit 230, and visually presents the information to the user.

The data processing system 100 of the embodiment of the present invention further includes the proof reading log storage unit 245, a log statistical information calculation unit 250, a log statistical information analysis unit 255, the carpet proof reading target list 260, an OCR output analysis unit 265, and a structure inference engine 270. These components are provided in order to present control information to the proof reading tool control unit 230.

The carpet proof reading target list 260 of the embodiment of the present invention includes a pair of a character contained in a document to be proofread and a tag representing the proof reading mode applied to the character. In the embodiment of the present invention, it is assumed that there are three kinds of tags: <accept> (indicating that proof reading is performed on the character by using both the carpet proof reading unit 220 and the side-by-side proof reading unit 225); <reject> (indicating that proof reading is performed on the character by using the side-by-side proof reading unit 225 alone); and <no-correction> (indicating that carpet proof reading and side-by-side proof reading are not performed on the character).

The operator can edit the carpet proof reading target list 260 via the input unit 235. For example, the operator can exclude the alphabet "l" and the numeral "1", distinction of which is difficult by just seeing the character, from carpet proof reading targets, and can attach the tag <reject> to them.

The OCR output analysis unit 265 of the embodiment of the present invention analyzes the OCR results, identifies as non-carpet proof reading targets, characters for which it is determined that carpet proof reading is inefficient in each document, in accordance with a predetermined rule, and updates the carpet proof reading target list 260. Specifically, in the embodiment of the present invention, the OCR output analysis unit 265 identifies, as the non-carpet proof reading targets, characters that appear in a document a predetermined number of times or less (e.g., once) (i.e., the tag <reject> is attached).

The structure inference engine 270 of the embodiment of the present invention performs structural analysis regarding an appearance position of each character in a document, identifies characters, proof reading of which is or is almost meaningless, as the non-proof reading targets, and updates the carpet proof reading target list 260. For example, characters located at an unused part, such as a part following the page number that is not the body of the document, are set as the non-targets (i.e., the tag <no-correction> is attached).

The proof reading log storage unit 245 of the embodiment of the present invention receives the log information including the time taken for correction and the correctness or incorrectness of the OCR results in each of the carpet proof reading unit 220 and the side-by-side proof reading unit 225 from the proof reading tool control unit 230, and stores the log information.

The log statistical information calculation unit 250 of the embodiment of the present invention calculates log statistical information on the basis of the log information in the proof reading log storage unit 245. Specifically, in the embodiment of the present invention, the following statistical information is calculated for each character. However, other statistical information may be calculated.

a: An estimated value of an expected value of a ratio of the number of character images that have been incorrectly recognized by OCR and have been corrected in carpet proof reading to the number of character images that have been processed
  b: An estimated value of an expected value of a ratio of the number of character images that have been incorrectly recognized by OCR and have not been corrected in carpet proof reading to the number of character images that have been processed
  u: An estimated value of an expected value of a time taken for attaching one character image with the mark indicating that correctness of OCR is unknown
  w: An estimated value of an expected value of a time taken for correcting one character image in side-by-side proof reading
  w': An estimated value of an expected value of a time taken for correcting one character image in carpet proof reading
  N: The number of times the recognition error is corrected in past processing
  M: The number of times the character image is subjected to carpet proof reading in past processing
  $N_{w'}$: The number of times the recognition error is corrected in carpet proof reading in past processing
  $N_U$: The number of times the OCR unknown mark is attached in past processing
  $N_w$: The number of times the recognition error is corrected in side-by-side proof reading in past processing In the embodiment of the present invention, each of the values N, M, $N_w$, $N_U$, and $N_W$ can be calculated by counting the number of events in the log information.

In response to occurrence of a predetermined event (e.g., the work for proof reading one document is finished in the embodiment of the present invention), the log statistical information analysis unit 255 determines which mode is the most efficient mode to perform proof reading on the basis of the statistical information calculated by the log statistical information calculation unit 250 by comparing an estimated value of the time taken when proof reading is performed by using both the carpet proof reading unit 220 and the side-by-side proof reading unit 225 with an estimated value of the time taken when proof reading is performed using the side-by-side proof reading unit 225 without using the carpet proof reading unit 220. In the embodiment of the present invention, the carpet proof reading target list 260 is updated on the basis of a result of the determination performed by the log statistical information analysis unit 255.

Specifically, in the embodiment of the present invention, the log statistical information analysis unit 255 determines whether to use both the carpet proof reading unit 220 and the side-by-side proof reading unit 225 in proof reading of a given character "x". If it is determined that proof reading is performed by using both, the character "x" is attached with the tag <accept> and is added to the carpet proof reading target list 260.

$$L := \text{empty set, for each } x \text{ in } X,$$

$$\tilde{a} \equiv \max\left(a - \sqrt{\frac{2\log M}{M}}, 0\right)$$

$$\tilde{b} \equiv \max\left(b - \sqrt{\frac{2\log M}{M}}, 0\right)$$

$$\tilde{u} \equiv \max\left(u - (u_U - u_L)\sqrt{\frac{2\log N_U}{N_U}}, u_L\right)$$

$$\tilde{w} \equiv \max\left(w - (w_U - w_L)\sqrt{\frac{2\log N_w}{N_w}}, w_L\right)$$

$$\tilde{w}' \equiv \max\left(w' - (w'_U - w'_L)\sqrt{\frac{2\log N_{w'}}{N_{w'}}}, w'_L\right)$$

$$\text{if } \tilde{b}\tilde{u} < \tilde{a}(\tilde{w} - \tilde{w}'), \text{ add } x \text{ to } L$$

where
  L: a set of characters contained in a target list,
  X: a set of characters that possibly appear in a document,
  x: an element of the set of characters X that appears in the document,
  ã: an estimated value of the lower limit of an expected value of a ratio of the number of character images that have been incorrectly recognized by OCR and have been corrected in carpet proof reading to the number of character images that have been processed,
  b̃: an estimated value of the lower limit of an expected value of a ratio of the number of character images that have been incorrectly recognized by OCR and have not been corrected in carpet proof reading to the number of character images that have been processed, $\tilde{u}$: an estimated value of the lower limit of an expected value of a time taken for attaching one character image with the mark indicating that correctness of OCR is unknown, $\tilde{w}$: an estimated value of the lower limit of an expected value of a time taken for correcting one character image in side-by-side proof reading, $\tilde{w}'$: an estimated value of the lower limit of an expected value of a time taken for correcting one character image in carpet proof reading, $u_U$: an upper limit (predetermined) of the time taken for attaching one character image with the mark indicating that correctness of OCR is unknown, $u_L$: the lower limit (predetermined) of the time taken for attaching one character image with the mark indicating that correctness of OCR is unknown, $w_U$: the upper limit (predetermined) of the time taken for side-by-side proof reading of one character image, $w_L$: the lower limit (predetermined) of the time taken for side-by-side proof reading of one character image, $w'_U$: the upper limit (predetermined) of the time taken for correcting one character image in carpet proof reading, and $w'_L$: the lower limit (predetermined) of the time taken for correcting one character image in carpet proof reading.

In the embodiment of the present invention, it should be noted that the foregoing procedure is performed in the following manner in order to reduce the influence of the biased statistics resulting from the small number of samples. For each parameter, a product (referred to as "corrected statistical information") of "the range that the parameter can take" and "the monotone decreasing function (corresponding to the square root part)" is calculated from "the statistical information of the parameter". On the basis of the corrected statistical information, "the estimated value of the time taken when proof reading is performed by using both the carpet proof reading unit 220 and the side-by-side proof reading unit 225" and "the estimated value of the time taken when proof reading is performed by using the side-by-side proof reading unit 225 without using the carpet proof reading unit 220" are calculated and compared. However, if the corrected statistical information is smaller than the lower limit of the parameter, the lower limit is used.

Figure 3:
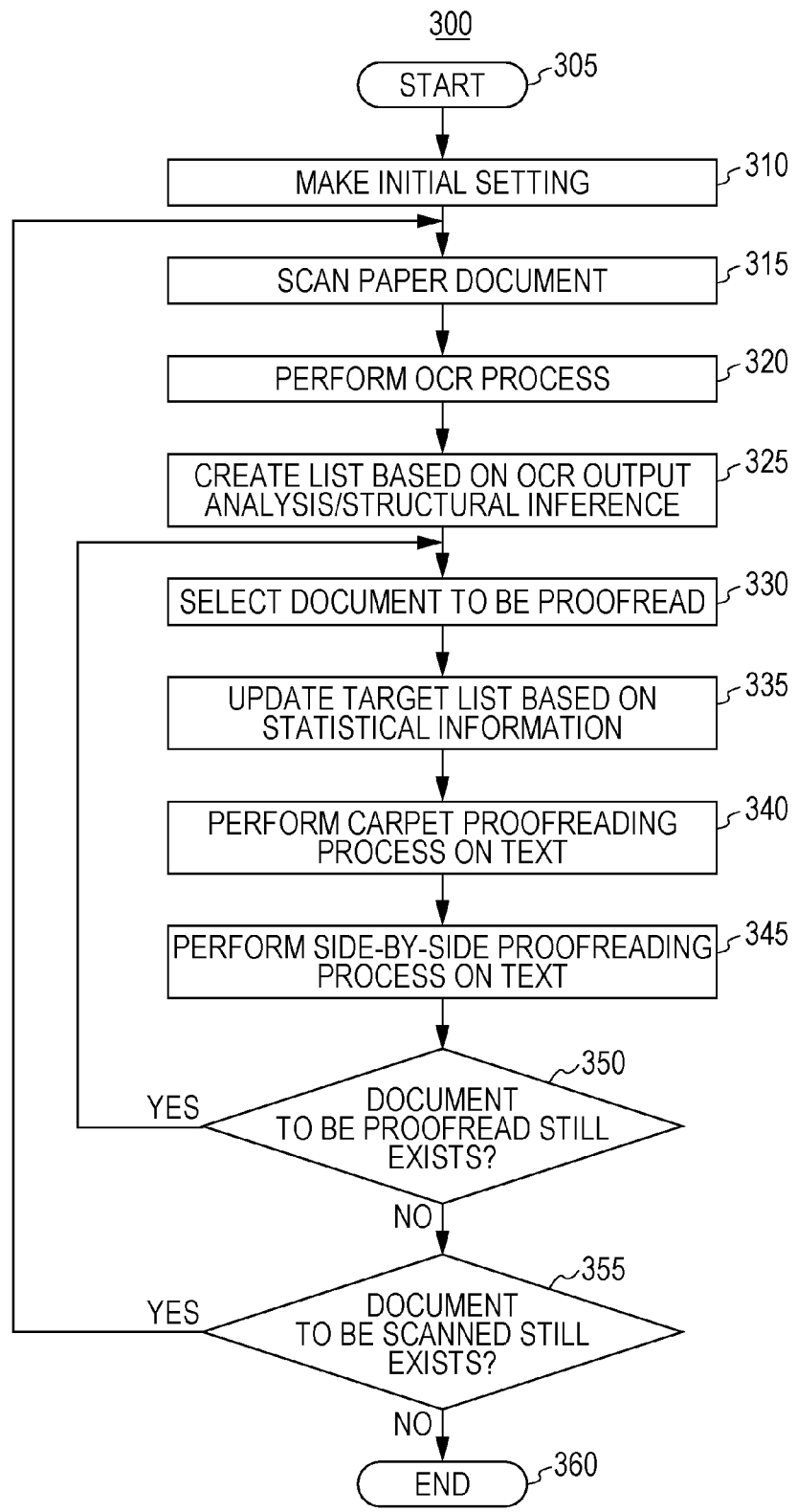
FIG. 3 is a flowchart representing the entire operation of the data processing system in the embodiment of the present invention.

FIG. 3 is a flowchart 300 representing an operation of the data processing system 100 in the embodiment of the present invention. The process starts in step 305. In step 310, initial setting is made by processing input that is entered by a user via the input unit 235. Such initial setting includes manual edition of the carpet proof reading target list 260 (attaching the tag <accept>, <reject>, or <no-correction> to a specific character and registering the specific character).

The process proceeds to step 315, and the image scanning unit 205 scans a paper document to be digitized. In the embodiment of the present invention, scanning may be performed on each document at one time or on many documents at one time. The scanned document is associated with information for identifying the document and information on the page number, whereby image data is formed. The image data is supplied to the OCR unit 210.

Subsequently, in step 320, the OCR unit 210 performs an OCR process. As a result of the OCR process, text data including recognized characters is formed and is stored in the text data storage unit 215. Then, in step 325, the OCR output analysis unit 265 and the structure inference engine 270 perform OCR output analysis and structural inference, respectively, and update the carpet proof reading target list 260.

The process proceeds to step 330, one of the documents scanned in step 315 that has not been proofread is selected. This selection may be performed such that the documents may be sequentially selected in the scanned order or the data processing system may select the document in accordance with another rule. Alternatively, the operator may select the document via the user interface.

Next, in step 335, the log statistical information analysis unit 255 updates the carpet proof reading target list 260 on the basis of the statistical information calculated by the log statistical information calculation unit 250 from the log of the past proof reading operations. Details of the updating have been already described in the description of the log statistical information analysis unit 255, and thus are not described here.

Next, in step 340, a carpet proof reading process is performed on the text of the document selected in step 330. The carpet proof reading process will be described in detail later by using FIG. 4. Next, in step 345, a side-by-side proof reading process is performed. The side-by-side proof reading process will be described in detail later by using FIG. 5. In steps 340 and 345, the log of the proof reading operations is recorded in the data processing system. Since the method for taking such a log can be appropriately performed by those skilled in the art, the method is not to be described any further here.

In step 350, whether or not image data of the document to be proofread still exists is determined. If it is determined that image data still exists in step 350, the process returns to step 330 through arrow YES. Selection of the proof reading target document (step 330) and the proof reading processes (steps 340 and 345) are repeated. If it is determined that image data does not exist in step 350, the process proceeds to step 355 through arrow NO, in which whether or not a paper document to be scanned still exists is determined. If it is determined that a paper document still exists in step 355, the process returns to step 315 through arrow YES and the following steps are repeated. If it is determined that a paper document does not exist in step 355, the process proceeds to step 360 through arrow NO, and ends.

Figure 4:
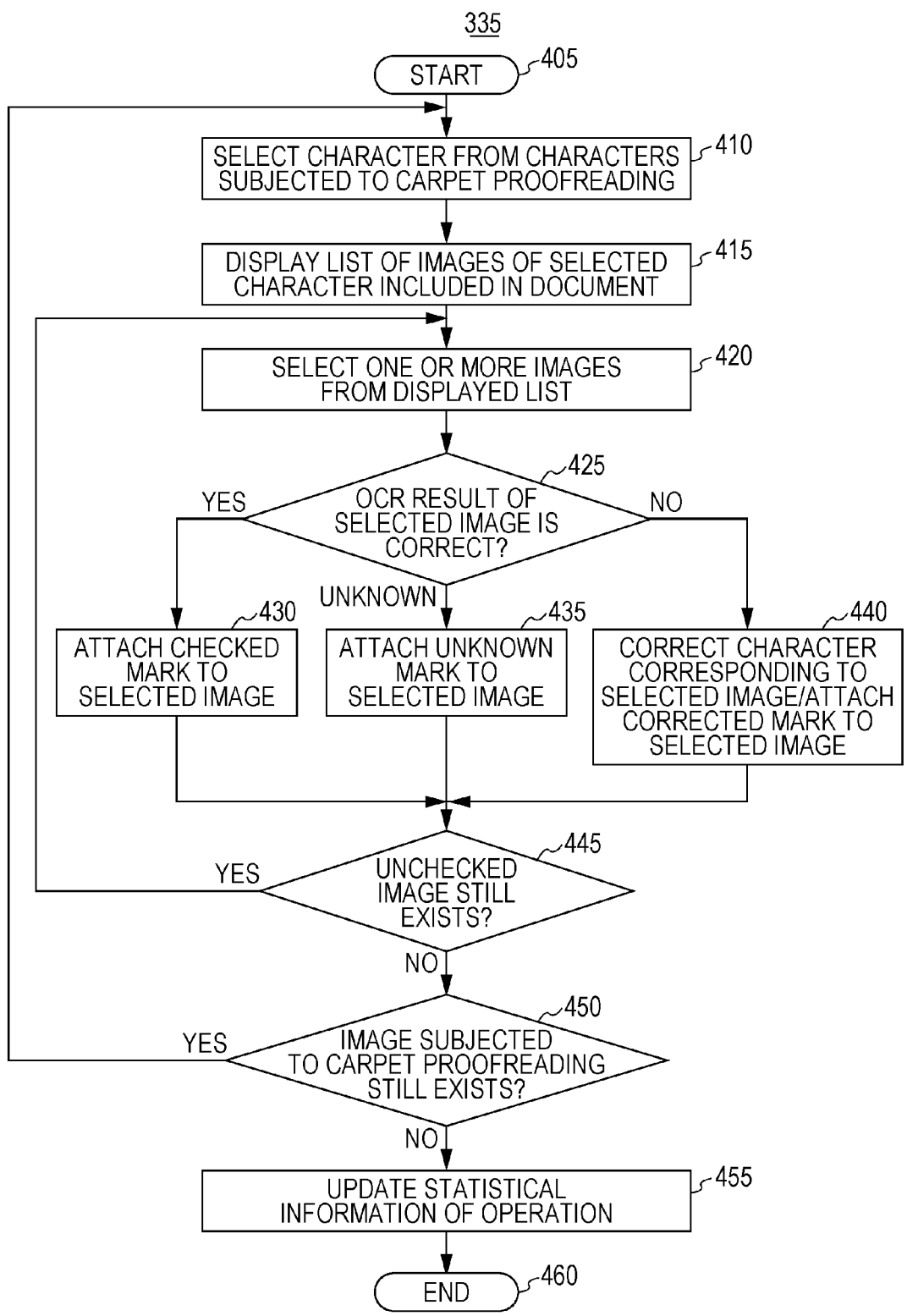
FIG. 4 is a flowchart representing an operation of a carpet proof reading process of the data processing system in the embodiment of the present invention.

Next, an example of the carpet proof reading process in step 340 of FIG. 3 will be described in more detail by using a flowchart 335 of FIG. 4. The process starts in step 405. In step 410, one character subjected to carpet proof reading (i.e., character attached with the tag <accept>) is selected from characters contained in the document to be proofread, with reference to the carpet proof reading target list 260. This selection may be made such that an operator manually selects the character from the displayed list or a computer may automatically select the character in accordance with a predetermined rule.

The process proceeds to step 415, character image portions are extracted which correspond to the character selected in step 410 and are contained in the document to be proofread, and the extracted image portions are collectively displayed via the interface 600 that has been already described by using FIG. 6. Next, in step 420, the operator selects one or more character images from among the collectively displayed character images for which whether or not the character images are correctly recognized as the character is to be determined. The data processing system accepts the selection.

The process proceeds to step 425, in which whether or not character recognition is correct is determined regarding the character image selected in step 420. If it is determined that character recognition is correct in step 425, the process proceeds to step 430 through arrow YES, and a mark "checked" is attached which indicates that it is confirmed that character recognition has been correctly performed on the selected image. The process proceeds to step 445.

If it is determined that correctness or incorrectness is unknown in step 425, the process proceeds to step 435 through arrow "unknown", and an "unknown" mark is attached which indicates that correctness or incorrectness of the recognized character is unknown in carpet proof reading. The process then proceeds to step 445.

If it is determined that the recognized character is incorrect in step 425, the process proceeds to step 440 through arrow "NO". The recognized character corresponding to the image is corrected and a "corrected" mark is attached which indicates that the incorrectly recognized character has been corrected. The process proceeds to step 445. The log of the operations is stored regarding this series of the carpet proof reading process.

In step 445, it is determined whether or not an unchecked image exists among the collectively displayed images. If it is determined that an unchecked image exists in step 445, the process returns to step 420 through arrow "YES" and the following steps are repeated. If it is determined that an unchecked image does not exist in step 445, the process proceeds to step 450 through arrow "NO". In step 450, it is determined whether or not a character subjected to carpet proof reading still exists among characters existing in the document to be proofread. If it is determined that a character exists in step 450, the process returns to step 410 through arrow "YES" and the following steps are repeated. If it is determined that a character does not exist in step 450, the process proceeds to step 455 through arrow "NO".

Next, in step 455, the log statistical information calculation unit 250 updates statistical information regarding the proof reading operation on the basis of the log information of the carpet proof reading. Specifically, in the embodiment of the present invention, the statistical information is updated in step 455 by means of a program that executes a procedure represented by the following pseudocode.

--- for each x in X # The following processing is performed on every element x of the character set X.
   M(x) += count(x) # The number of times the element is subjected to this proof reading is added.
   $N_w(x)$ += count_corrected(x) # The number of times the recognition error is corrected in this proof reading is added.
   $N_U(x)$ += count_marked(x) # The number of times the unknown mark is attached in this proof reading is added.
   $T_w(x)$ += total_time_for_correction(x) # The time taken for correction in this proof reading is added.
   $T_U(x)$ += total_time_for_mark(x) # The time taken for attaching the unknown mark this proof reading is added.
   $a(x) = N_w(x)/M(x)$
   $b(x) = N_U(x)/M(x)$
   $w'(x) = T_w(x)/M(x)$
   $u(x) = T_U(x)/N_U(x)$

---

Upon the update of the statistical information being completed in step 455, the process ends in step 460.

Figure 5:
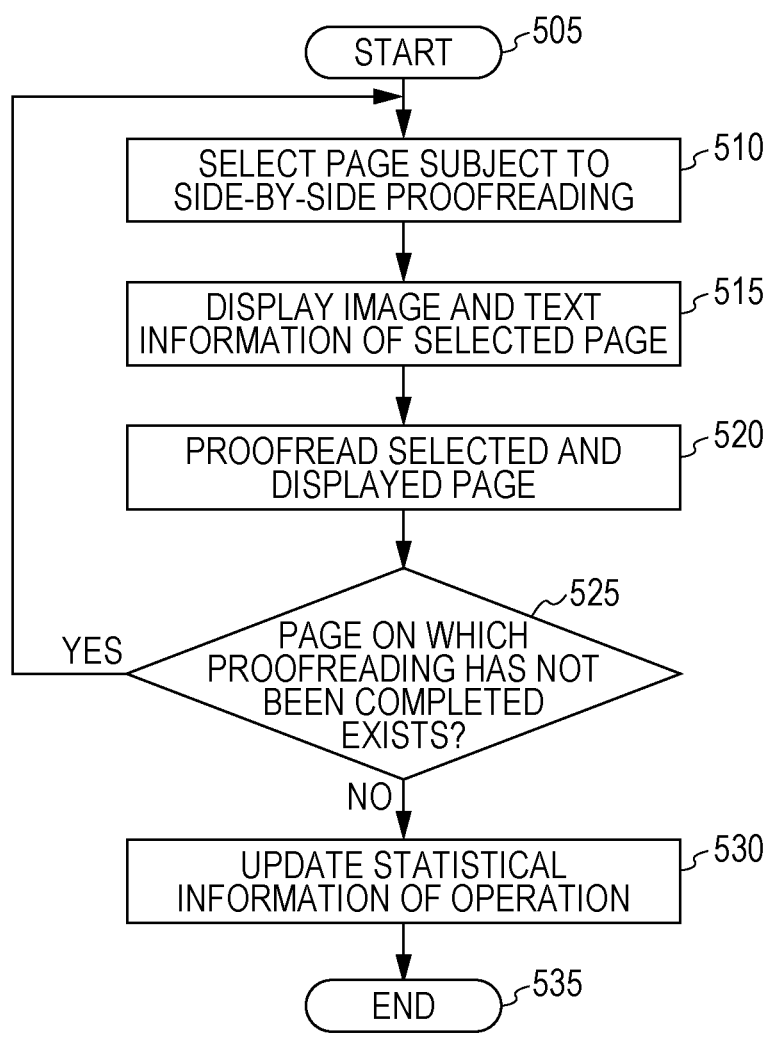
FIG. 5 is a flowchart representing an operation of a side-by-side proof reading process of the data processing system in the embodiment of the present invention.

Next, an example of the side-by-side proof reading process performed in step 345 of FIG. 3 will be described in more detail by using a flowchart 340 of FIG. 5. FIG. 5 is the flowchart 340 representing the side-by-side proof reading process of the data processing system 100 in the embodiment of the present invention. The process starts in step 505. Next, in step 510, a page subjected to the side-by-side proof reading is selected.

The process proceeds to step 515, in which regarding the page selected in step 510, the scanned image of the page and the corresponding text data resulting from character recognition are simultaneously presented to the operator via the user interface 700 illustrated in FIG. 7. At this time, characters for which character recognition has already been confirmed to be correct in carpet proof reading and for which recognition errors have been already corrected in carpet proof reading are displayed such that the operator can know that these characters are not subjected to side-by-side proof reading. Additionally, characters attached with the "unknown" mark in carpet proof reading are displayed such that the operator can know that the "unknown" mark is attached. Various display methods are possible. For example, characters are displayed in different colors, however the display method is not limited to this example. As already described, it should be noted that the units in which the image and the text data are displayed in side-by-side proof reading are not limited to pages, and the image and the text data may be compared in units of sentences or lines.

The process proceeds to step 520, in which the side-by-side proof reading is performed on the page having been selected in step 510 and displayed in step 515. The log of all proof reading operations is recorded regarding this series of side-by-side proof reading process.

Next, in step 525, it is determined whether or not a page on which side-by-side proof reading has not been completed exists among the document to be proofread. If it is determined that a page exists in step 525, the process returns to step 510 through arrow "YES" and the following steps are repeated. If it is determined that a page does not exist in step 525, the process proceeds to step 530 through arrow "NO".

In step 530, the log statistical information calculation unit 250 updates the statistical information regarding the proof reading operations on the basis of the log information of the side-by-side proof reading. Specifically, in the embodiment of the present invention, the statistical information is updated in step 530 by means of a program that executes a procedure represented by the following pseudocode.

--- for each x in X # The following processing is performed on every element x in the character set X.
   $N_w(x)$ += count_corrected(x) # The number of times the recognition error is corrected in this proof reading is added.
   $T_w(x)$ += total_time_for_correction(x) # The time taken for correction in this proof reading is added.
   $w(x) = T_w(x)/N(x)$

---

Upon the update of the statistical information being completed in step 530, the process ends in step 535.

Figure 9:
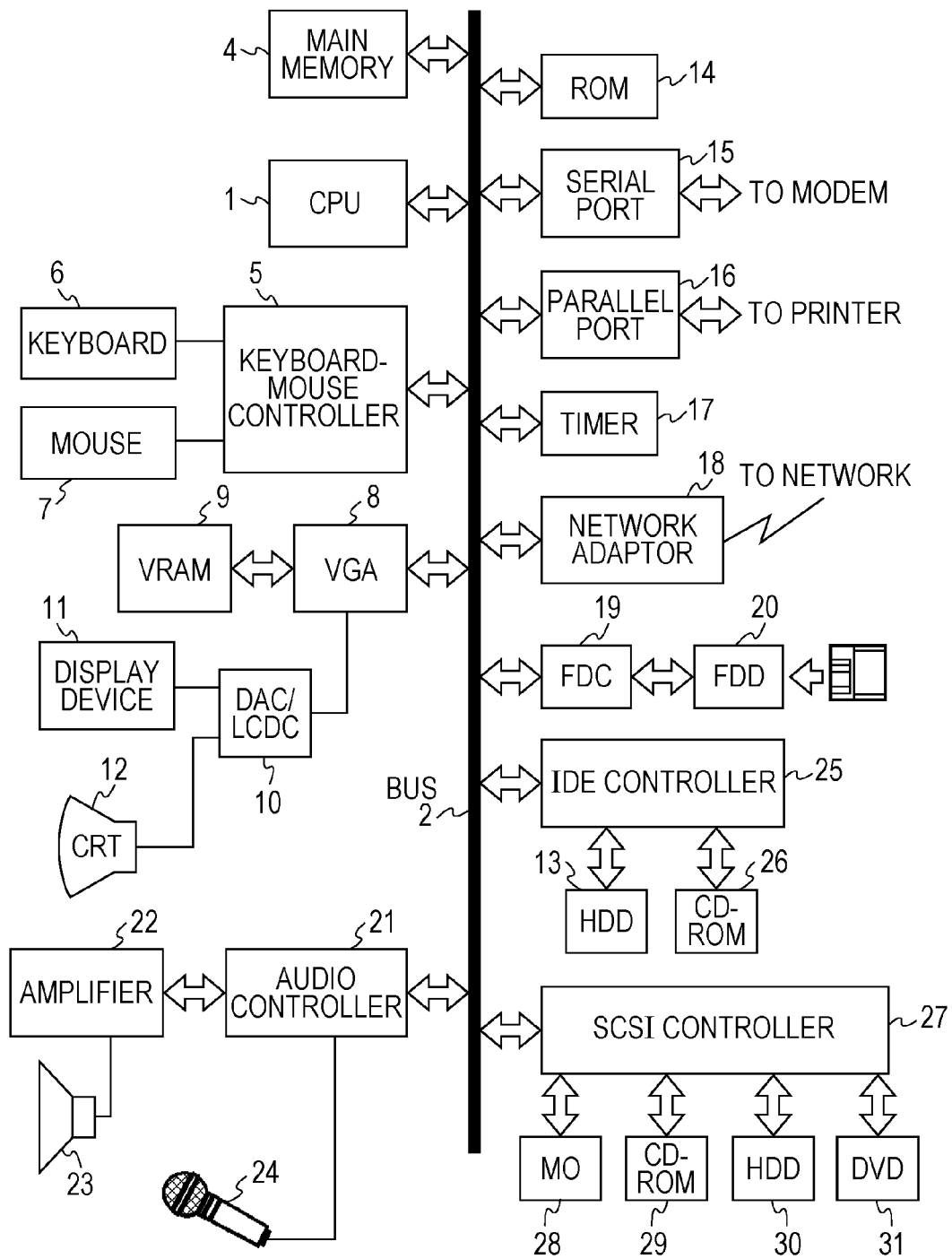
FIG. 9 is a diagram illustrating an example of a hardware configuration of an information processing apparatus suitable for realizing the data processing system in the embodiment of the present invention.

FIG. 9 is a diagram illustrating an example of a hardware configuration of an information processing apparatus suitable for realizing the terminal 110 according to the embodiment of the present invention. The information processing apparatus includes the central processing unit (CPU) 1 and the main memory 4 that are connected to a bus 2. Hard disk drives 13 and 30 and removable storage (external storage system in which recording media are replaceable), such as CD-ROM drives 26 and 29, a flexible disk drive 20, an MO drive 28, and a DVD drive 31, are connected to the bus 2 via a flexible disk controller 19, an IDE controller 25, a SCSI controller 27, and so forth.

A storage medium, such as a flexible disk, an MO, a CD-ROM, or a DVD-ROM, is inserted into the removable storage. On such a storage medium, the hard disk drives 13 and 30, and a ROM 14, code of a computer program, which operates in cooperation with the operating system to give instructions to the CPU or the like and carries out the present invention, can be recorded. The computer program is loaded into the main memory 4, thereby being executed. The computer program may be compressed or divided into a plurality of pieces and recorded on a plurality of media.

The information processing apparatus receives input from input devices, such as a keyboard 6 and a mouse 7, via a keyboard-mouse controller 5. The information processing apparatus is connected to a display device 11 for presenting visual data to a user, via a DAC/LCDC 10.

The information processing apparatus is connected to a network via a network adaptor 18 (such as an Ethernet (registered trademark) card or a token-ring card) and can perform communication with other computers or the like. The information processing apparatus may be connected to a printer via a parallel port 16 or may be connected to a modem via a serial port 15.

It should be easily understood from the above description that the information processing apparatus suitable for realizing the data processing system according to the embodiment of the present invention is realized by an information processing apparatus such as an ordinary personal computer, workstation, or mainframe, or a combination thereof. However, the above-described components are merely illustrative and all of the components are not necessarily mandatory for the present invention.

It is obvious to those skilled in the art that various modifications may be made such that the functions of the hardware components of the information processing apparatus used in the embodiment of the invention are distributed to a plurality of machines and are realized. Obviously, these modifications are concepts included in the spirit of the present invention.

The data processing system 100 according to the embodiment of the present invention adopts an operating system that supports a graphical user interface (GUI) multi-window environment, such as Windows® operating system from Microsoft Corporation, Mac OS® from Apple Computer Inc., and UNIX® system having X Window System (e.g., AIX® from International Business Machines Corporation).

From the description above, it can be understood that the data processing system used in the embodiment of the present invention is not limited to a specific multi-window operating system environment.

As described above, according to the embodiment of the present invention, the efficient proof reading system, software, and method are realized which can appropriately control the carpet proof reading tool and the side-by-side proof reading tool. Accordingly, it can be easily understood that the productivity of a user who operates the proof reading system and corrects OCR recognition errors can be increased.

Moreover, the present invention may be implemented as hardware, software, or a combination of hardware and software. Embodiments in the form of a combination of hardware and software include, as a typical embodiment, an embodiment in the form of a data processing system including a predetermined program. In such a case, the predetermined program controls the data processing system and causes the data processing system to perform the processes according to the present invention by being loaded into the data processing system and executed. The program is composed of a command group that can be represented by a predetermined language, code, or notation. Such a command group allows the system to execute a specific function directly or after performing one or both of 1. conversion to another language, code, or notation and 2. copying to another medium.

Obviously, the scope of the present invention encompasses not only such a program but also a medium having the program stored thereon. The program for performing the functions of the present invention may be stored in any computer-readable recording medium such as a flexible disk, an MO, a CD-ROM, a DVD, a hard disk drive, a ROM, an MRAM, or a RAM. Such a program may be downloaded from another data processing system connected through a communication line or copied from another recording medium so as to be stored in the recording medium. Moreover, such a program may be compressed or divided into a plurality of pieces to be stored in a single recording medium or a plurality of recording media. Moreover, it should be noted that a program product implementing the present invention can be provided in various forms.

It is obvious to those skilled in the art that various modifications and improvements can be made in the foregoing embodiment. For example, in the foregoing embodiment of the present invention, an example has been disclosed in which the specific carpet proof reading tool having the user interface 600 illustrated in FIG. 6 is used. However, a modification for using any other carpet proof reading tool can be made. The any other carpet proof reading tool includes a context-attached carpet proof reading tool having a user interface 800 illustrated in FIG. 8.

Figure 8:
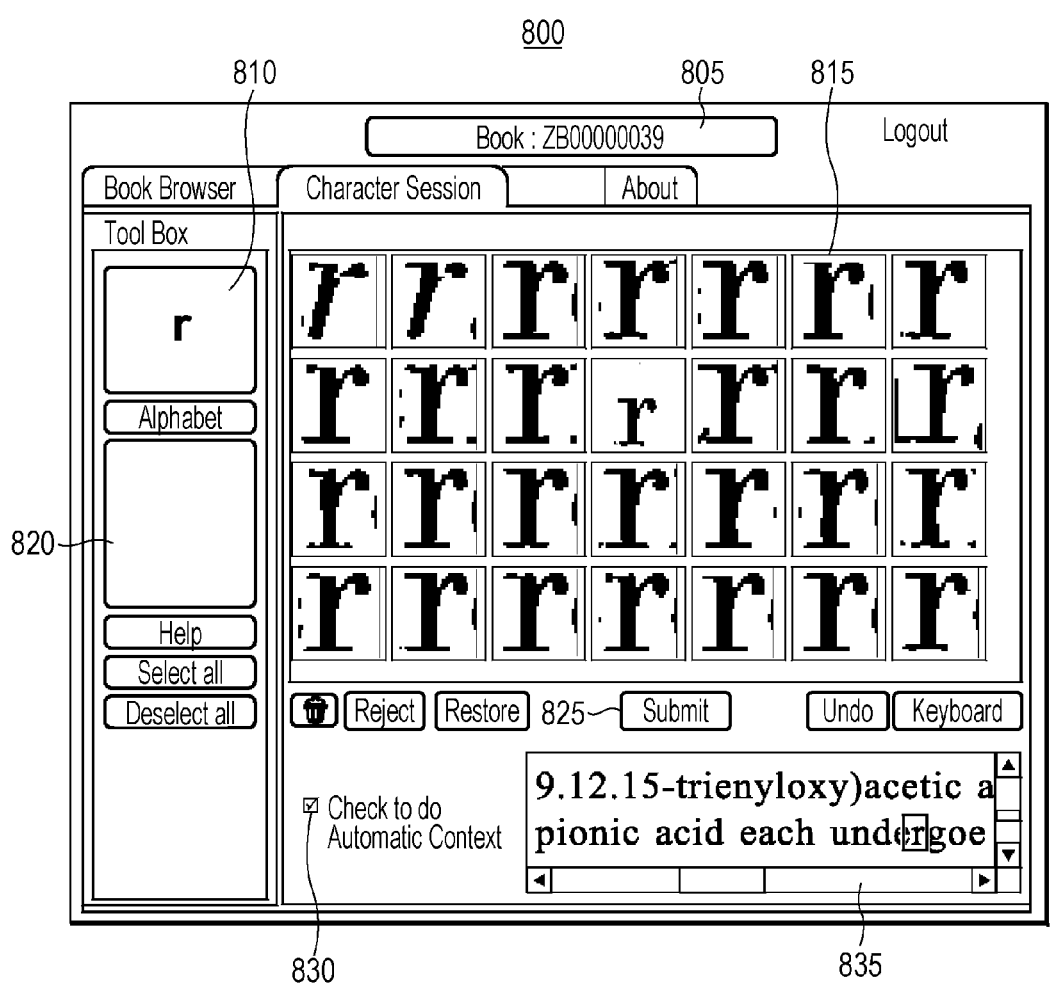
FIG. 8 is an example of a snapshot of an interface used in a context-attached carpet proof reading process.

Specifically, the user interface 800 illustrated in FIG. 8 includes a small field 835 for presenting context (i.e., a surrounding part of the character image) of the selected character image to a user and a checkbox 830 for activating the context display function, in addition to components 805 to 825 corresponding to the components 605 to 625 of the user interface 600 of FIG. 6. In this case, unlike the foregoing embodiment, highly accurate proof reading may be performed by using the carpet proof reading tool alone (without using the side-by-side proof reading tool).

However, when the context-attached carpet proof reading tool is used, unlike the carpet proof reading tool used in the foregoing embodiment, collective correction is not available and the context has to be checked. Accordingly, proof reading is not always done faster than when the side-by-side proof reading tool is used. For this reason, in this case, it is also meaningful to decide whether or not to use the carpet proof reading tool by comparing a first estimated value of the time taken for performing proof reading using the carpet proof reading tool that is calculated based on the log information with a second estimated value of the time taken for performing proof reading using the side-by-side proof reading tool without using the carpet proof reading tool.

As another modification, in a case where training data corresponding to the log information is available before starting the operation of the data processing system of the embodiment of the present invention, the time taken for proof reading can be optimized from the start of the operation by using the training data.

As another modification, when a probability that "the time taken for proof reading without using the carpet proof reading tool" is longer than "the time taken for proof reading by using the carpet proof reading tool" is almost one regarding a certain character, the character can be added to the list as the target of the carpet proof reading tool As another modification, in order to handle a possibility that a sufficient number of samples are not obtained for each character, clustering is performed on a plurality of characters and the statistical information is calculated for each cluster from the log information. Examples of clustering may include: (1) a method for forming one cluster for all characters; (2) a method for forming clusters of characters in spaces of parameters of the statistical information, such as "the ratio of the number of character images that have been incorrectly recognized by OCR and have been corrected in carpet proof reading", "the ratio of the number of character images that have been incorrectly recognized by OCR and have not been corrected in carpet proof reading", "the time taken for attaching one character image with the mark indicating that correctness is unknown", "the time taken for correcting one character image in side-by-side proof reading", and "the time taken for correcting one character image in carpet proof reading"; (3) a method for forming a cluster for each character type, such as hiragana, katakana, Chinese characters, numerals, alphabets, or symbols.

Each parameter of the statistical information may be calculated from the log information or the training data corresponding to the log information in the following manner First, the parameter "a" can be calculated by dividing "the number of times correction is made in carpet proof reading" by "the number of character images having been processed". The parameter "b" can be calculated by dividing "the number of times correction is made in side-by-side proof reading" by "the number of character images having been processed". The parameter "c" can be calculated by subtracting the current values of "a" and "b" from one (i.e., c=1−a−b).

The parameters "u" and "w" can be determined in the following manner Specifically, suppose that, regarding one carpet proof reading process, T represents the time taken for the proof reading process, $\alpha$ represents the number of character images having been checked, $\beta$ represents the number of character images attached with the unknown mark, and $\gamma$ represents the number of corrected character images. Additionally, suppose that, regarding this carpet proof reading process, U represents the time taken for attaching one character image with the mark indicating that correctness is unknown, W' represents the time taken for attaching one character image with the mark indicating that correctness is unknown, and V represents the time taken for checking whether or not character recognition of the image is correct. In this case, "T=$\alpha$V+$\beta$U+$\gamma$W'" is satisfied. By performing linear regression on this equation by using the least square method, "V", "U", and "W" can be determined. By determining the averages of "U" and "W" which are determined in this manner for all carpet proof reading processes, "u" and "w" can be calculated.

In the embodiment of the present invention, "w" can be calculated by determining an average of the log of carpet proof reading in which $\alpha$=0, $\beta$=0, and $\gamma$=0, or by determining "W" by using the latest estimated values of "U" and "V" having been calculated for samples for $\gamma$=1 and then determining an average thereof.

The value of "T" may be extremely large when the operator takes a rest during the work. When samples having such abnormal values are taken into account, the values of "u", "w", and "w" may be incorrectly determined. Accordingly, in the embodiment of the present invention, samples having the value of "T" that is greater than a predetermined threshold are excluded in calculation of "u", "w", and "w".

Furthermore, in the embodiment of the present invention, the units in which proof reading is performed with the carpet proof reading tool are "characters". However, proof reading may be performed in larger units, such as in units of sets of characters or of words, or another attribute may be set as the units of proof reading. In the embodiment of the present invention, an image subjected to the carpet proof reading is attached with the mark "checked", "unknown", or "corrected". However, when there are images attached with no mark when carpet proof reading is completed, a specific mark (e.g. the mark "checked") may be attached to those images.

Moreover, in the embodiment of the present invention, the specific corrected statistical information is calculated and then "the estimated value of the time taken when proof reading is performed by using both the carpet proof reading unit 220 and the side-by-side proof reading unit 225" and "the estimated value of the time taken when proof reading is performed by using the side-by-side proof reading unit 225 without using the carpet proof reading unit 220" are calculated on the basis of the specific corrected statistical information, in order to reduce the influence of the biased statistics resulting from a small number of samples. However, such a calculation process is just an example, and the two estimated values to be compared may be calculated by using the uncorrected statistical information or by using any other method. Obviously, the modifications or improvements above are also included in the technical scope of the present invention.

What is claimed is:

1. A system for supporting proof reading of text data generated through optical character recognition, the system comprising:
   a memory and storage medium;
   a processor communicatively coupled to the memory and the storage medium, the processor programmed to execute machine readable instructions for performing a method comprising:
   performing, with a first proof reading tool, carpet proof reading on the text data;
   performing, with a second proof reading tool, side-by-side proof reading on the text data;
   storing, with a storage unit, a log of time to perform proof reading operations having been performed on a particular recognized character value within the text data serving as units by using the first proof reading tool and the second proof reading tool; and
   estimating, with an analysis unit, a first estimated value of time to perform proof reading of the particular recognized character value within the text data using the first proof reading tool along with the second proof reading tool, the first estimated value of time being independent of recognition accuracy of the optical character recognition, and the first estimated value of time being based upon times, recorded in the log, that had been taken to perform proof reading of the particular recognized character value using the first proof reading tool along with the second proof reading tool;
   estimating, with the analysis unit, a second estimated value of time to perform proof reading of the particular recognized character value within the text data using the second proof reading tool without using the first proof reading tool, the second estimated value of time being independent of recognition accuracy of the optical character recognition, and the second estimated value of time being based upon times, recorded in the log, that had been taken to perform proof reading of the particular recognized character value using the second proof reading tool without using the first proof reading tool;
   determining, with the analysis unit, for each particular recognized character value within the text data, based on the first estimated value being less than the second estimated value of time, to use the first proof reading tool along with using the second proof reading tool; and
   determining, with the analysis unit, for each particular recognized character value within the text data, based on the second estimated value being less than the first estimated value of time, to use the second proof reading tool without using the first proof reading tool.

2. The system according to claim 1, wherein the units on which carpet proof reading is performed is a character.

3. The system according to claim 2,
   wherein proof reading is performed by using the second proof reading tool after proof reading is performed by using the first proof reading tool, and wherein when whether or not a recognized character is correct is unknown in the proof reading performed by using the first proof reading tool, the recognized character is attached with a mark indicating that correctness is unknown.

4. The system according to claim 3, wherein the character attached with an unknown mark is presented to an operator so that it is indicated that whether or not the character is correct is unknown in carpet proof reading.

5. The system according to claim 2, the method further comprising
calculating statistical information on the basis of the log.

6. The system according to claim 5, wherein the calculating comprises, for each character, as the statistical information, at least one of:
  a: an estimated value of an expected value of a ratio of a number of character images that have been incorrectly recognized by OCR and have been corrected in carpet proof reading to a number of character images that have been processed,
  b: an estimated value of an expected value of a ratio of the number of character images that have been incorrectly recognized by OCR and have not been corrected in carpet proof reading to the number of character images that have been processed,
  u: an estimated value of an expected value of a time taken for attaching one character image with a mark indicating that correctness of OCR is unknown,
  w: an estimated value of an expected value of a time taken for correcting one character image in side-by-side proof reading, and
  w': an estimated value of an expected value of a time taken for correcting one character image in carpet proof reading.

7. The system according to claim 6, the method further comprising calculating, on the basis of the statistical information, at least one of:
  $\tilde{a}$: an estimated value of a lower limit of an expected value of a ratio of the number of character images that have been incorrectly recognized by OCR and have been corrected in carpet proof reading to the number of character images that have been processed,
  $\tilde{b}$: an estimated value of the lower limit of the expected value of the ratio of the number of character images that have been incorrectly recognized by OCR and have not been corrected in carpet proof reading to the number of character images that have been processed,
  $\tilde{u}$: an estimated value of the lower limit of the expected value of the time taken for attaching one character image with the mark indicating that correctness of OCR is unknown,
  $\tilde{w}$: an estimated value of the lower limit of the expected value of the time taken for correcting one character image in side-by-side proof reading, and
  $\tilde{w}'$: an estimated value of the lower limit of the expected value of the time taken for correcting one character image in carpet proof reading,
  and determining whether or not to use the first proof reading tool in proof reading of the character on the basis of a result of the calculating.

8. The system according to claim 7, the method further comprising determining whether or not to use the first proof reading tool in proof reading of the character based on a procedure as follows:

$$L := \text{empty set, for each } x \text{ in } X,$$

$$\tilde{a} \equiv \max\left(a - \sqrt{\frac{2\log M}{M}}, 0\right)$$

$$\tilde{b} \equiv \max\left(b - \sqrt{\frac{2\log M}{M}}, 0\right)$$

$$\tilde{u} \equiv \max\left(u - (u_U - u_L)\sqrt{\frac{2\log N_U}{N_U}}, u_L\right)$$

$$\tilde{w} \equiv \max\left(w - (w_U - w_L)\sqrt{\frac{2\log N_w}{N_w}}, w_L\right)$$

$$\tilde{w}' \equiv \max\left(w' - (w'_U - w'_L)\sqrt{\frac{2\log N_{w'}}{N_{w'}}}, w'_L\right)$$

if $\tilde{b}\tilde{u} < \tilde{a}(\tilde{w} - \tilde{w}')$, add $x$ to $L$, where
  L: a set of characters contained in a target list,
  X: a set of characters that possibly appear in a document,
  x: an element of the set of characters X that appears in the document,
  $u_U$: an upper limit of the time taken for attaching one character image with the mark indicating that correctness of OCR is unknown,
  $u_L$: the lower limit of the time taken for attaching one character image with the mark indicating that correctness of OCR is unknown,
  $w_U$: the upper limit of the time taken for side-by-side proof reading of one character image,
  $w_L$: the lower limit of the time taken for side-by-side proof reading of one character image,
  $w'_U$: the upper limit of the time taken for correcting one character image in carpet proof reading,
  $w'_L$: the lower limit of the time taken for correcting one character image in carpet proof reading,
  N: The number of times the recognition error is corrected in past processing,
  The number of times one of the character images is subjected to carpet proof reading in past processing,
  Nw': The number of times the recognition error is corrected in carpet proof reading in past processing,
  Nu: The number of times the mark indicating that correctness of OCR is unknown is attached in past processing, and
  Nw: The number of times the recognition error is corrected in side-by-side proof reading in past processing.

9. The system according to claim 5, the method further comprising clustering on a plurality of characters, and calculating, for each cluster, the statistical information from the log.

10. The system according to claim 9, the method further comprising performing one of (1) formation of one cluster for all characters, (2) formation of a cluster based on a space of each parameter of the statistical information, and (3) formation of a cluster for each character type.

11. The system according to claim 1, further comprising
  writing to a list, based on one of determining to use the first proof reading tool along with using the second proof reading tool and determining to use the second proof reading tool without using the first proof reading tool, on which recognized character values the first proof reading tool along with the second proof reading tool is to be used.

12. The system according to claim 11, further comprising a control unit configured to control the first and second proof reading tools on the basis of the list.

13. The system according to claim 1, wherein the first proof reading tool is a context-attached carpet proof reading tool.

14. The system according to claim 1, wherein the second proof reading tool is configured to arrange and present image data and text data in units of at least one of pages, sentences, and lines.

15. A non-transitory computer program product for supporting proof reading of text data generated through optical character recognition, the computer program product comprising a computer readable storage medium having computer program code embodied therewith, the computer program code executable by a processor to perform:
  preparing a first proof reading tool for performing carpet proof reading of the text data;
  preparing a second proof reading tool for performing side-by-side proof reading of the text data;
  recording a log of time to perform proof reading operations having been performed on a particular recognized character value within the text data serving as units by using the first proof reading tool and the second proof reading tool;
  estimating a first estimated value of time to perform proof reading of the particular recognized character value within the text data using the first proof reading tool followed by using the second proof reading tool, the first estimated value of time being independent of recognition accuracy of the optical character recognition, and the first estimated value of time being based upon times, recorded in the log, that had been taken to perform proof reading of the particular recognized character value using the first proof reading tool followed by using the second proof reading tool;
  estimating a second estimated value of time to perform proof reading of the particular recognized character value within the text data using the second proof reading tool without using the first proof reading tool, the second estimated value of time being independent of recognition accuracy of the optical character recognition, and the second estimated value of time being based upon times, recorded in the log, that had been taken to perform proof reading of the particular recognized character value using the second proof reading tool without using the first proof reading tool;
  determining for each particular recognized character value within the text data, based on the first estimated value being less than the second estimated value of time, to use the first proof reading tool along with using the second proof reading tool; and
  determining for each particular recognized character value within the text data, based on the second estimated value being less than the first estimated value of time, to use the second proof reading tool without using the first proof reading tool.

16. The non-transitory computer program product according to claim 15, wherein the units on which carpet proof reading is performed is a character.

17. The non-transitory computer program product according to claim 16,
  wherein proof reading is performed by using the second proof reading tool after proof reading is performed by using the first proof reading tool,
  wherein when whether or not a recognized character is correct is unknown in the proof reading performed by using the first proof reading tool, the recognized character is attached with a mark indicating that correctness is unknown, and
  wherein the character attached with an unknown mark is presented to an operator so that it is indicated that whether or not the character is correct is unknown in carpet proof reading.

18. The non-transitory computer program product according to claim 16, further comprising
  calculating with a calculation unit statistical information on the basis of the log.

19. The non-transitory computer program product according to claim 18, wherein the calculation unit is able to calculate, for each character, as the statistical information, at least one of:
  a: an estimated value of an expected value of a ratio of a number of character images that have been incorrectly recognized by OCR and have been corrected in carpet proof reading to a number of character images that have been processed,
  b: an estimated value of an expected value of a ratio of the number of character images that have been incorrectly recognized by OCR and have not been corrected in carpet proof reading to the number of character images that have been processed,
  u: an estimated value of an expected value of a time taken for attaching one character image with a mark indicating that correctness of OCR is unknown,
  w: an estimated value of an expected value of a time taken for correcting one character image in side-by-side proof reading, and
  w': an estimated value of an expected value of a time taken for correcting one character image in carpet proof reading.

20. A system for supporting proof reading of text data generated through optical character recognition, the system comprising:
  a first proof reading tool for performing carpet proof reading on the text data;
  a second proof reading tool for performing side-by-side proof reading on the text data;
  a storage unit configured to store a log of proof reading operations having been performed by using the first proof reading tool and the second proof reading tool;
  a calculation unit configured to calculate statistical information on the basis of the log, wherein the calculation unit is able to calculate, for each character, as the statistical information, at least one of:
  a: an estimated value of an expected value of a ratio of a number of character images that have been incorrectly recognized by OCR and have been corrected in carpet proof reading to a number of character images that have been processed,
  b: an estimated value of an expected value of a ratio of the number of character images that have been incorrectly recognized by OCR and have not been corrected in carpet proof reading to the number of character images that have been processed,
  u: an estimated value of an expected value of a time taken for attaching one character image with a mark indicating that correctness of OCR is unknown,
  w: an estimated value of an expected value of a time taken for correcting one character image in side-by-side proof reading, and
  w': an estimated value of an expected value of a time taken for correcting one character image in carpet proof reading; and an analysis unit configured to determine, for each attribute serving as units in which carpet proof reading is performed with the first proof reading tool, whether or not to use the first proof reading tool in proof reading of the attribute, by comparing a first estimated value of a time taken when proof reading is performed by using the first proof reading tool with a second estimated value of a time taken when proof reading is performed by using the second proof reading tool without using the first proof reading tool, the first and second estimated values being calculated on a basis of the log, wherein the attribute serving as units in which carpet proof reading is performed is a character, wherein the analysis unit calculates, on the basis of the statistical information, at least one of:

$\tilde{a}$: an estimated value of a lower limit of an expected value of a ratio of the number of character images that have been incorrectly recognized by OCR and have been corrected in carpet proof reading to the number of character images that have been processed, $\tilde{b}$: an estimated value of the lower limit of the expected value of the ratio of the number of character images that have been incorrectly recognized by OCR and have not been corrected in carpet proof reading to the number of character images that have been processed, $\tilde{u}$: an estimated value of the lower limit of the expected value of the time taken for attaching one character image with the mark indicating that correctness of OCR is unknown, $\tilde{w}$: an estimated value of the lower limit of the expected value of the time taken for correcting one character image in side-by-side proof reading, and $\tilde{w}'$: an estimated value of the lower limit of the expected value of the time taken for correcting one character image in carpet proof reading, and determines whether or not to use the first proof reading tool in proof reading of the character on the basis of a result of the calculation and in accordance with a procedure as follows:

$L :=$ empty set, for each $x$ in $X$, $$\tilde{a} \equiv \max\left(a - \sqrt{\frac{2\log M}{M}}, 0\right)$$

$$\tilde{b} \equiv \max\left(b - \sqrt{\frac{2\log M}{M}}, 0\right)$$

$$\tilde{u} \equiv \max\left(u - (u_U - u_L)\sqrt{\frac{2\log N_U}{N_U}}, u_L\right)$$

$$\tilde{w} \equiv \max\left(w - (w_U - w_L)\sqrt{\frac{2\log N_w}{N_w}}, w_L\right)$$

$$\tilde{w}' \equiv \max\left(w' - (w'_U - w'_L)\sqrt{\frac{2\log N_{w'}}{N_{w'}}}, w'_L\right)$$

if $\tilde{b}\tilde{u} < \tilde{a}(\tilde{w} - \tilde{w}')$, add $x$ to $L$, where L: a set of characters contained in a target list, X: a set of characters that possibly appear in a document, x: an element of the set of characters X that appears in the document, $u_U$: an upper limit of the time taken for attaching one character image with the mark indicating that correctness of OCR is unknown, $u_L$: the lower limit of the time taken for attaching one character image with the mark indicating that correctness of OCR is unknown, $w_U$: the upper limit of the time taken for side-by-side proof reading of one character image, $w_L$: the lower limit of the time taken for side-by-side proof reading of one character image, $w'_U$: the upper limit of the time taken for correcting one character image in carpet proof reading, $w'_L$: the lower limit of the time taken for correcting one character image in carpet proof reading, N: The number of times the recognition error is corrected in past processing, The number of times one of the character images is subjected to carpet proof reading in past processing, Nw': The number of times the recognition error is corrected in carpet proof reading in past processing, Nu: The number of times the mark indicating that correctness of OCR is unknown is attached in past processing, and Nw: The number of times the recognition error is corrected in side-by-side proof reading in past processing.

\* \* \* \* \*